United States Patent
Srinivasan et al.

(10) Patent No.: US 7,303,671 B2
(45) Date of Patent: Dec. 4, 2007

(54) ION EXCHANGE PARTICLE-BOUND FLOW-THROUGH POROUS MONOLITH

(75) Inventors: Kannan Srinivasan, Tracy, CA (US); Philip Zakaria, Sandy Bay (AU); Nebojsa Avdalovic, Cupertino, CA (US); Christopher A. Pohl, Union City, CA (US); Paul R. Haddad, Sandy Bay (AU)

(73) Assignee: Dionex Corporation, Sunnyvale, CA (US)

( * ) Notice: Subject to any disclaimer, the term of this patent is extended or adjusted under 35 U.S.C. 154(b) by 42 days.

(21) Appl. No.: 10/778,010

(22) Filed: Feb. 11, 2004

(65) Prior Publication Data

US 2005/0173346 A1   Aug. 11, 2005

(51) Int. Cl.
*B01D 15/08* (2006.01)

(52) U.S. Cl. ............... 210/198.2; 210/502.1; 210/635; 210/656

(58) Field of Classification Search ............. 210/502.1, 210/635, 656, 198.2; 95/88; 96/101
See application file for complete search history.

(56) References Cited

U.S. PATENT DOCUMENTS

| 3,485,658 | A | * | 12/1969 | Iler | 428/328 |
|---|---|---|---|---|---|
| 4,101,460 | A | * | 7/1978 | Small et al. | 521/28 |
| 4,252,644 | A | * | 2/1981 | Small et al. | 210/656 |
| 4,376,047 | A | * | 3/1983 | Pohl | 210/198.2 |
| 4,447,559 | A | | 5/1984 | Hanaoka et al. | |
| 4,927,539 | A | * | 5/1990 | Stevens et al. | 210/635 |
| 5,066,784 | A | | 11/1991 | Sherrington et al. | |
| 5,094,895 | A | * | 3/1992 | Branca et al. | 428/36.91 |
| 5,183,545 | A | * | 2/1993 | Branca et al. | 204/252 |
| 5,324,752 | A | * | 6/1994 | Barretto et al. | 521/28 |
| 5,334,310 | A | | 8/1994 | Frechet et al. | |
| 5,453,185 | A | | 9/1995 | Frechet et al. | |
| 5,532,279 | A | | 7/1996 | Barretto et al. | |
| 5,767,167 | A | | 6/1998 | Ferry | |
| 5,929,214 | A | | 7/1999 | Peters et al. | |
| 6,610,546 | B1 | | 8/2003 | Liu et al. | |

\* cited by examiner

*Primary Examiner*—Ernest G. Therkorn
(74) *Attorney, Agent, or Firm*—Morgan, Lewis & Bockius LLP; David J. Brezner

(57) ABSTRACT

A flow-through ion exchange medium comprising a monolithic stationary phase having interconnecting pores defined by pore walls, and fine ion exchange polymeric layering particles irreversibly bound directly or indirectly to the pore walls, and methods of making such medium and its use on chromatographic separators.

7 Claims, No Drawings

ION EXCHANGE PARTICLE-BOUND FLOW-THROUGH POROUS MONOLITH

BACKGROUND OF THE INVENTION

The present invention relates to a flow-through ion exchange medium suitable for chromatography or other forms of separation.

One form of chromatography uses columns packed with a resin typically in the form of granules or particles having adsorptively active surfaces which have been coated with a substance which is functionally active. Preferable shapes for the discrete particle are spheres with regular surfaces. Materials for performing liquid chromatography are known where only thin outer surfaces of the chromatographic support materials are available for active exchange of ions with liquid media. For example, Small, et al. U.S. Pat. No. 4,101,460 describes an ion exchange composition comprising Component A, in insoluble synthetic resin substrate having ion-exchanging sites, at least on its available surface, and having Component B, a finely divided insoluble material, irreversibly attached thereto. Other particulate bed materials with ion exchange layering particles on the outer surface are described in Barretto, U.S. Pat. No. 5,532,279. Barretto describes an ion exchange composition comprising synthetic resins support particles, in dispersant capable of suspending the support particles in an aqueous medium to inhibit or prevent agglomeration, and fine synthetic layering particles. In on embodiment, the complex is formed by contacting a suitable dispersant with monomer in an aqueous solution in which the monomer is insoluble. Under suitable conditions for suspension polymerization, the monomer will polymerize to form resin support particles having a dispersant irreversibly attached to those particles. A number of different embodiments are disclosed for such irreversible attachment.

Frechet, U.S. Pat. No. 5,334,310, describes a continuous liquid chromatographic column which includes a rigid tube and a continuous plug of a macroporous organic polymer within the column extending across the cross-section area of the column. The patent specifically describes a plug containing small pores having diameters less than 200 nm and large pores having diameters greater than about 600 nm. It is generally believed that the larger pores are primarily responsible for permeability and smaller mesopores (e.g., less than 200 nm), which are generally believed to aid in the retention of species to be separated. A variety of polymers are disclosed for use in such continuous plugs or monolithic medium in contrast to the packed bed of particles described above.

U.S. Pat. No. 5,929,214 discloses the preparation of thermally responsive monolithic phases by grafting the pores with thermally responsive polymers or copolymers.

Other monolithic phases used as suppressor packings include radiation grafted materials as set forth in U.S. Pat. No. 6,610,546.

U.S. Pat. No. 5,767,167 discloses the preparation of organic aerogel foams suitable for filtration in concentrating media formed from free radical polymerization of trifunctional or higher functional organic monomers.

Izhizuka & coworkers (Journal of Chromatography A, 797 (1998) 133-137) developed a sol gel process for preparing monolithic phases based on hydrolysis and polycondensation of alkoxysilanes in the presence of water soluble polymers. A bimodal pore structure was observed. One major benefit of a monolithic phase is lower pressure due to a more open pore structure allowing the use of high flow rates without excessive pressure.

In chromatography, the van Deemter equation in terms of HETP is defined as:

$$HETP = A + B/\mu + C\mu$$

$\mu$ is the average linear velocity of the mobile phase or eluent and A, B and C are constants. A represents the eddy diffusion which is due to the variation of pathways available through the pores in the column and is independent of the mobile phase velocity, B represents the longitudinal diffusion of the sample components in the mobile phase and C represents the mass transfer. A is characteristic of the column packing and can be decreased with smaller uniform particles and higher packing density. Typically packing columns with smaller particles uniformly is difficult and adapting a monolithic column with the present invention would allow effective reduction in HETP and hence improved separation efficiencies.

The B term is negligible at the high flow rates possible with monolithic columns leading to higher efficiencies. The C term is the mass term transfer and increases with increasing flow rate however several researchers have shown that due to the structure of the monolith this term is not greatly influenced by the higher flow rates.

In ion chromatography the use of latex agglomerated support particles for separations is well accepted. As discussed above, these materials typically consist of a monolayer of small charged colloidal or latex particles that are bound on the surface of larger substrate resin particles. The column capacity and selectivity of the above phases could be optimized based on the choice of the latex and substrate particles. These phases showed higher efficiencies due to faster kinetics and greater permeability relative to standard functionalized or grafted resin phases.

It is difficult to operate the above columns at higher flow rates due to the pressure limitation of these columns. While it is possible to increase the porosity of conventional resins in order to lower the backpressure, the limitation is the lack of mechanical strength of such phases under chromatography conditions.

Therefore it is one objective of the present invention to remove the limitation of high backpressure under high flow conditions and be able to increase separation through put using latex based phases.

The advantage of using a monolithic column is the benefit of lower backpressure allowing the use of higher flow rates and thus leading to higher separation through put. Researchers have demonstrated better mass transport properties of the monolithic phase over conventional resin based phases thus leading to improved separations. Due to the lower pressure drop, steeper flow gradients are possible with a monolithic phase. It was also possible to use longer columns to increase resolution. Monolithic phases however require strict control of conditions during manufacturing. This limitation makes scaleup difficult.

Therefore it is another objective of the present invention to address the limitation of scaleup of monolithic phases.

SUMMARY OF THE INVENTION

One embodiment of the present invention comprises flow-through ion exchange medium comprising a monolithic stationary phase having interconnecting pores defined by pore walls, and fine ion exchange polymeric layering particles irreversibly bound directly or indirectly to the pore walls.

Another embodiment comprises a method of making the foregoing ion exchange medium and a method of using the medium in separation such as the chromatographic separations.

DETAILED DESCRIPTION OF THE PREFERRED EMBODIMENTS

According to the present invention, a flow-through ion exchange medium is provided in which fine synthetic ion exchange polymeric layering particles are irreversibly bound directly or indirectly to the pore walls of a monolithic stationary phase having interconnecting pores defined by pore walls. This application will first describe the monolithic stationary phase.

As used herein, the term "monolithic stationary phase" refers to a continuous medium in the form of a plug or like, typically bound to the walls of a tube and forming combination with the tube a chromatographic column. The phases of the present invention can be used for any form of ion exchange separation of a liquid sample including chromatography, separations including ion chromatography separations, capillary electrochromatographic separations, and the like. The phases of the present invention can be preferably packed into column hardware including guard columns and/or separator columns, or concentrator columns for liquid chromatography. Preferably the monolithic stationary phase of the present invention is useful for ion exchange separations.

In one embodiment, the monolithic phase is a bimodal pore distribution such as described in U.S. Pat. No. 5,334,310. As used herein, the term "bimodal distribution" means a monolith having large pores (e.g., greater than 600 nm to 3000 nm) primarily responsible for permeability and smaller mesopores (e.g., less than 200 nm), which are generally believed to aid in the retention of species to be separated. In the monolithic phases of the prior art, the ion exchange sites for separation are bound as chemical moieties directly to the walls of the pores in the monolithic phase, rather than as components of layering particles.

In another preferred embodiment the monolith has no bimodal pore distribution and only pores larger than 200 nm are preferred. Such phases when agglomerated with latex as per the present invention lead to improved retention and efficiency of separations, smaller pores (<200 nm) lead to band dispersion and lower efficiencies.

Other monolithic porous phases which can be used are described in U.S. Pat. No. 5,767,167 which describes preparation of organic aerogel foams suitable for filtration in concentrating medium. A sol gel process for preparing a monolithic phase is described by Izhizuka & coworkers (Journal of Chromatography A, 797 (1998) 133-137). This method is based on hydrolysis and polycondensation of alkoxysilanes in the presence of water soluble polymers. This product also has a bimodal pore structure.

Another form of monolithic phase is described in Example 4 of Liu, U.S. Pat. No. 6,610,546 in which a porogen can be readily removed by dissolution in an acid, or base or the solvent porogen can be displaced leaving a monolithic phase of the desired porosity. Suitable porogens are disclosed in that example.

Other suitable forms of monolithic stationary phases are described in U.S. Pat. No. 5,021,462 which describes a porous polymer with pores in the range of 0.5-100 um and 75 to 98% pore volume. Yet other materials for forming monolithic stationary phases are described in U.S. Pat. No. 5,066,784 and U.S. Pat. No. 4,965,289 with similar properties as described in U.S. Pat. No. 5,021,462 and with an entrapped gel phase and suitable for chromatography and chemical synthesis. Yet other materials for forming monolithic phases are described in U.S. Pat. No. 4,611,014, U.S. Pat. No. 4,612,334 and U.S. Pat. No. 4,668,709 which describes highly porous crosslinked functionalized polymers having interconnected cavities or pores with a pore volume greater than 5.66 cc/g.

The monolithic phase may be made from a polymer to which the ion exchange polymeric layering particles may be bound as described hereinafter. Any of the polymers described in the prior art literature may be used as the monolithic polymer phase. For example, the synthetic resin polymer materials described as the support particles in Barretto, U.S. Pat. No. 5,532,279, could be used to form the monolithic phase of the present invention. Also, the monolithic polymer may be of the type described in U.S. Pat. No. 5,334,310.

Also, the polymers useful for the monolithic phase include not only the foregoing materials which are organic polymer-based but also include inorganic materials such as inorganic oxides not limited to silica, alumina, zirconia, titanium and various combinations including hybrid organic and inorganic materials such as organo silica materials.

In accordance with the present invention, fine ion exchange polymeric layering particles are irreversibly bound directly or indirectly to the pore walls of the monolithic stationary phase described above. Layering particles of the same size ranges used in the prior art for layering support particles may be used in the present invention for layering the pore walls of a monolith. In one embodiment, the support particles are in a latex emulsion as illustrated in the '279 patent. Similarly, the layering particles may be formed of the polymers set forth in that patent or other polymers that have suitable functionality for both attaching directly or indirectly to the pore walls of the monolith as well as the desired functionality for separation of components of a liquid stream in use of the monolith. Suitably, the layering particles are in a colloidal size range in an aqueous latex dispersion as described in the '279 patent.

As used herein, the term "irreversibly attached" means that most of the layering particles will not be displaced from attachment from the pores of the monolithic phase by solutions of strong electrolytes, or by shearing forces created such as when a liquid is passed through the monolithic phase within a chromatography column under pressure. "Irreversibly attached" includes attachment directly to the pore walls or indirectly as through a dispersant as described in Barretto, U.S. Pat. No. 5,532,279. It includes attachment of the particles by covalent bonding or electrostatic forces as well as physical adsorption. The general mechanisms of attachment to the support particles in Barretto through a dispersant as that term is used in that patent may be used for attachment to the pores of the present invention. One form of attachment comprises electrostatic attachment. As described in the '279 patent, the ion exchange column may be formed by polymerizing a suitable monomer in the presence of a dispersant functional group which will react with the monomer to irreversibly attach the dispersant to the resulting polymer forming the monolithic polymer stationary phase. The monolithic stationary phase-dispersant contact complex can be formed into a slurry in a non-solvent liquid and packed into a column. Suitable modes of forming the continuous or monolithic phase can be as described in U.S. Pat. No. 5,334,310. Suitable dispersant materials as set forth in Barretto, U.S. Pat. No. 5,532,279. The fine resin layering particles can then be functionalized, e.g., by amination or sulfonation. The suspension of fine resin layering particles can then be passed through the monolithic layer. Alternatively, as illustrated in the above patent, the monolithic particle-dispersant complex can be contacted with latex derived particles which are previously functionalized.

Another form of irreversible attachment is described in the '279 patent as covalent attachment. Again, the monolithic stationary phase-dispersant complex can be bound to the layering particles in the manner described in the '279 patent. The monolithic phase may be prepared by copolymerizing a charged monomer with an uncharged monomer yielding a polymer with ionic functionalities. The monolith with the charged functionalities are then available for layering with particles as per the present invention. For example a monolith with sulfonated groups originating from a monomer such as 2-Acrylamido-2-methyl-1-propanesulfonic acid may be agglomerated as per the present invention with aminated latex layering particles thereby forming through electrostatic interaction a latex agglomerated monolithic phase of the present invention.

Irreversible binding may also be performed by adsorption. For example a polystyrene divinylbenzyl monolith as described in Example 4 of U.S. Pat. No. 5,453,185 may be treated with layering particles that are described in Example 2 of U.S. Pat. No. 4,376,047 (raw vinylbenzyl chloride latex before amination). The layering particles in this case are held by the monolith by adsorption. The monolithic column is then functionalized by treating with an amine such as trimethylamine to create anion exchange sites on the surface of the monolithic phase as per the present invention. Other modes of binding the resin ion exchange layering particles to the pores of the monolithic layer may be accomplished without a dispersant. For example, see Small, U.S. Pat. No. 4,101,460 which describes an ion exchange composition comprising an insoluble resin substrate having ion exchange sites electrostatically and irreversibly attached to a finely divided insoluble particles of opposite charge.

The present phases offer improved control of capacity and selectivity through optimal choice of the monolithic phase and the latex. The capacity of the monolithic phase would impact the capacity of the latex and the selectivity of the separations. In addition the latex type and capacity would play a role in the separations. The properties of various forms of the layering particles are discussed in U.S. Pat. No. 5,532,279 and U.S. Pat. No. 4,101,460.

The capacity of the column of the present invention is affected by many parameters. For example the presence of synthesis byproducts in the latex formulation such as oligomers and surfactants will lower the capacity of the column.

Other parameters that affect the capacity include the concentration of the latex and the flow rate at which it is agglomerated (during in column agglomeration). Ultra dilute latex formulations will lead to lower capacity columns. Higher flow rates would also lead to lower capacity columns. Depending on the desired capacity of the column, the latex concentration and flow rate could be optimized.

In another embodiment, the monolithic phase is prepared with a reactive polymer that is reacted after the monolith is formed to create the desired functionalities. For example a polystyrene divinylbenzene monolith as described in Example 4 of U.S. Pat. No. 5,453,185 may be reacted with sulfuric acid reagent after the monolith is formed to create surface sulfonate groups for interaction with the latex. The monolith with the charged sulfonate functionalities are then available for layering with particles as per the present invention. For example, a monolith with sulfonated groups may be agglomerated as per the present invention with aminated latex layering particles thereby forming through electrostatic interaction a latex agglomerated monolithic phase of the present invention.

In another embodiment, the neutral monolithic phase is grafted with an ionic monomer to form desired functionalities. For example an acrylate based monolith can be further treated with a charged ionic monomer such as methacylamidopropyltrimethyl ammonium chloride in the presence of an Azo initiator such as 4,4-Azobis(4-cyanopentanoic acid) at 50° C. The monolith with the charged amines are then available for layering with particles as per the present invention. For example the above monolith with amine groups may be agglomerated as per the present invention with sulfonated latex layering particles thereby forming through electrostatic interaction a latex agglomerated monolithic phase of the present invention.

In another embodiment, the neutral monolithic is grafted with an ionic initiator to form desired functionalities for bonding to the layering particles. For example a polystyrene divinylbenzene monolith as described in Example 4 of U.S. Pat. No. 5,453,185 may be treated with imitators such as per sulfate or Azobis cyanovaleric acid to create a negative surface charge that is available for latex agglomeration with an aminated latex as per the present invention.

Monolithic polymers react with suitable reagents to create the desired functionalities. These are standard sulfonation and amination reactions employed to generate sulfonated or aminated sites on the monolithic phase.

In general, monolithic stationary phases formed with pores of the desired general dimension (e.g., with pore size greater than 200 nm) followed by reaction with the layering particles which are flowed through monolithic phase under pressure to cause bonding to occur. The flow rate and concentration are optimized to get the desired capacity.

One form of structure is a porous matrix or a sponge-like material formed in sulfonated, cross-linked polystyrene with a porosity of about 20 to 80% permitting a flow rate velocity of about 0.001 to 10 bed volumes/second at a column pressure of <3000 psi.

Assuming a circular cross-section column, the monolithic phase may be formed into a disc with an outer circumference contact in the inner wall of the column. In one embodiment, it is a continuous matrix which extends along the entire length of the column. In another embodiment, the monolith may be in the form of disc or other shape of defined thickness which conform to the inner walls of the column. The monolith may also be disposed in columns or channels of cross-sectional shapes other than circular, such as rectangular or square.

Established techniques may be used for addressing the so called "wall effect" for use of the monolith in a column. This includes and is not limited to shrinking or fitting suitable polymer column over the monolith to minimize voids between the monolithic phase and the interior wall of the column material for example using radial compression column hardware. Another approach would be shrink the monolith in suitable solvent and after fitting into the column enclosure switch to a solvent which swells the monolith phase thereby fitting the monolith to the column tightly leaving no voids and thus minimize or eliminate the wall effect.

The medium may be further modified with one or more types of colloidal species leading to multiple layers on the monolithic surface. For example after agglomerating the monolithic phase with an aminated latex it is possible to add another sulfonated latex attached through electrostatic forces to the surface thereby offering both anion exchange and cation exchange sites on the surface of the monolith. This column would be useful for separating anionic and cationic analytes.

The present invention offers several advantages over prior art phases such as:

1) Being able to control column capacity and selectivity through optimal choice of the monolithic phase and the colloidal phase. In contrast using prior art monolithic phases limited control of capacity and selectivity is possible.

2) Since the amount of colloidal phase required for the formation of the phases of the present invention is small, scale up is feasible leading to more reproducible phases (from column to column) thus leading to reproducible separations. Scaleup of prior art monolithic phases is difficult and requires strict control of the manufacturing materials and conditions.

3) Since the active functionalities involved in the retention process are uniformly spread on the surface, efficiencies are higher using the phases of the present invention. Typically prior art approaches rely on a functionalization or grafting reaction which may not always lead to uniform coverage on the surface thereby leading to lower efficiencies.

The disclosure of all publications described in the foregoing patent specification are incorporated herein by reference.

In order to illustrate the present invention, specific non-limiting examples of its practice are set forth.

EXAMPLE 1

The following outlines the process of making a monolith inside a capillary.

A) Capillary derivatization: The following reagents were pressurized through a 250 μm ID capillary (40 cm was used in the above experiment although the following procedure is suitable for making longer lengths) in the given order using 50 mbar pressure (unless otherwise noted). The pressure may be increased if needed for coating longer lengths.
1. 20 minute rinse with acetone
2. 20 minute rinse with DI water
3. 60 minute rinse with 1 M NaOH
4. 10 minute rinse with DI water
5. 60 minute rinse 1N HCl
6. 10 minute rinse DI water
7. 40 minute rinse ethanol
8. 100 minute rinse at 20 mbar with γ-MAPS solution
9. 10 minute rinse min ethanol
10. 3 hours at 4 bar with nitrogen The γ-MAPS (3-(trimethoxysilyl)propyl methacrylate) solution was prepared by making a 20% (w/w) g-MAPS solution in ethanol (95% ethanol adjusted to pH 5.0 with acetic acid). The resultant derivatized capillary can then be stored at room temperature until needed.

B) Monolith preparation: 0.024 g (1% w/w with respect to the monomers) of AIBN (2-2' Azodi(isobutyronitrile) or benzoyl peroxide is dissolved in 2.4 g of monomer mixture (40% ethylene dimethacrylate, 60% butyl methacrylate). Prior to use both the ethylene dimethacrylate and butyl methacrylates were filtered through basic alumina and stored in the freezer until use.

1.8% w/w AMPS (2-Acrylamido-2-methyl-1-propane-sulfonic acid) {of the total polymerization mixture (6 g in this case)} is then added to this mixture.

The porogenic mixture (total mass of 3.6 g) is then added which generally comprised of 55% 1-propanol, 35% 1,4-butanediol and 10% water. While the percentage of water remained constant, varying the percentage of 1-propanol (most preferably between 55-60%) varied the physical properties of the resultant monolith.

The complete monolithic mixture (which preferably comprised of 40% monomers and 60% porogen) is then sonicated for ~10 min and then purged with nitrogen for ~20 minutes.

This solution is then flushed into the derivatized capillary (from step A) using a syringe. The capillary is then sealed at both ends using rubber septa. The capillary (and remaining polymerization mixture sealed in a glass vial) are then placed in a water bath at 60° C. for AIBN (70° C. when using benzoyl peroxide) for 24 hours.

Following polymerization, 5 cm or so is cut from each end of the monolithic column and methanol is flushed through the monolithic column at ~1500-2000 PSI for 4-5 hours. This is followed by flushing with water for a further few hours. The monolith is now ready for the latex agglomeration step.

EXAMPLE 2

Polyvinyl Benzyl Chloride latex (0.075 micron) was prepared following Example 2 in U.S. Pat. No. 4,376,047 and is listed below.
Aerosol A-103 (American Cyanamid): 0.93%
Sodium Bicarbonate (as 5% water solution): 0.40%
Potassium per sulfate (as 5% water solution): 0.40%
Organic monomer phase: 1.00%
Sodium Pyrosulfite (metabisulfite) (as 5% water solution): 0.27%
Deionized water: 96.97%
Surfynol 104 (Air Products): 0.03%

The Aerosol A-103, bicarbonate, persulfate, Surfynol 104 and water are added to a suitable vessel, mixed until uniform and clear, purged of oxygen by bubbling nitrogen through the solution for 5-10 minutes and cooled in an ice bath. Cold, pre-mixed organic monomer phase is then added to the aqueous phase and nitrogen purging continued for an addition 5-10 minutes, after which the pyrosulfite is added. The nitrogen purge is continued 2-3 minutes more, then the reaction vessel is capped and mildly tumble-agitated for 20-24 hours at 30. degree. C. The organic monomer phase is 95% vinyl benzyl chloride, 33% of impure (57% active) divinyl benzene, and 0.67% n-hexadecane. The resulting latex is then aminated in a conventional manner with trimethylamine.

EXMAPLE 3

Latex agglomeration: The latex solution from Example 2 was filtered through a 0.45 um filter and diluted 1:100 in DI water. The diluted latex is then pushed into the monolithic column from Example 1 for ~2 hours at 1500-2000 PSI. The latex agglomerated monolithic column is now ready for anion analysis.

EXAMPLE 4

A 250 μm×30 cm column from Example 1 was agglomerated with a proprietary latex from Dionex Corporation (Proprietary latex used in a product sold under the name IonPac AS 10) following the agglomeration steps outlined in Example 3. The above latex agglomerated column was then used for anion analysis. The eluent comprised of 20 mM Tris/10 mM Chloride at pH 8.15 and was pumped at a flow rate of 7.8 μL/min. Detection was accomplished using a standard UV detector at 214 nm. The sample loop comprised of 50 μm×5 cm tubing. The sample test mixture comprised of Iodate, Bromate, Nitrite, Bromide, Nitrate and Benzene sulfonate at a concentration of 0.5 mM. Excellent separation of Iodate from Bromate and Nitrite can be observed. Bromide and Nitrite were partially resolved from one other under these conditions and Benzene sulfonate was well resolved from all ions. The total run time for the analysis was within 5.5 minutes. The above results demonstrated the utility of the above latex agglomerated column for anion analysis. Repeated injections (n=3) showed reproducible separations with the above column.

EXAMPLE 5

A modified version of the monolith preparation process published in U.S. Pat. No. 5,453,185 was used in this example. A PEEK tube 9×150 mm was closed on one end with silicon rubber septum and a solid rubber plug at the other end. A polymerization mixture was prepared by mixing 3 ml styrene, 2 ml DVB 7.5 ml dodecanol and 0.5 g azobisisobutyronitrile. The mixture was de aerated by purging nitrogen for 15 min. The mixture was injected through the septum into the PEEK tube and polymerization was started by heating the tube in a water bath at 70 C. After 24 hours the tube was removed and cooled. The column was fitted with standard PEEK end fittings and flushed with methanol at a flow rate of 0.2 ml/min for 1 hour and at 1 ml/min for 1 hour. After opening the end fitting at the outlet end the monolith was pumped out of the column by pumping at 20 ml/min. Sulfonation: The monolith was cut into discs and was added to a reflux cylinder with sulfuric acid and sulfonated at 105° C. for 120 minutes. The monolith was then rinsed with DI water. Column packing: The monolith was then cut into several 3 mm id. discs to match the id of the column. The 3 mm discs were then inserted into a 3×50 mm column hardware using a soft plastic insert through the outlet end of the column (with the inlet end fitted with a bed support and column end fitting). The discs were pushed tightly against each other ensuring that there were no voids. The thickness of the last monolith disc was adjusted (if needed) to fit flush with the outlet end of the column. The outlet end of the column was fitted with a bed support and column end fitting. The column was flushed with DI water at 1 ml/min. The column was ready for the latex agglomeration step.

EXAMPLE 6

Latex agglomeration: Prepare a 1% latex solution (from Example 2) in 400 mM acetic acid. Pump the latex into the sulfonated monolithic column of Example 5 at a flow rate of 0.2 ml/min. Pump until the latex appears out of the column. Flush with DI water followed by the eluent. The latex agglomerated column can now be used for anion analysis.

EXAMPLE 7

A cation exchange monolith was prepared following Example 5 in U.S. Pat. No. 6,610,546. The base material was porous polyethylene in sheet or rod form with a preferred porosity of 35 μm (Porous Technologies). The preferred porosity range for the base material varied from 5 μm-100 μm. Small pieces of the above material is soaked in a solution of 40-60% styrene (preferred range is 20-100% graft level) w/w in methylene chloride solvent. The sheet material has a preferred thickness of 1.6 mm before grafting. Grafting is accomplished by irradiation with gamma rays at a dose of 10,000 rads/hour for about 48-120 hours at 80-90. degree. F. under nitrogen atmosphere. The material is then soaked in 10% w/w chlorosulfonic acid in methylene chloride or suitable solvent for 4 hours at about 40. degree. C. The material is then immersed in 1M KOH at 55. degree. C. for 30 minutes and then rinsed and washed with DI water.

EXAMPLE 8

In this example, an anion exchange monolith was prepared following Example 6 in U.S. Pat. No. 6,610,546. The base material is similar to the one described in the above example. Small pieces of the base material are soaked in a solution of 40-60% vinylbenzylchloride w/w in methylene chloride solvent. Grafting is accomplished by irradiation with gamma rays of a dose of 10,000 rads/hour for about 100-200 hours at 80-90. degree. F. under nitrogen atmosphere. The material is heated under reflux in a solution of 20% trimethylamine w/w in methylene chloride or suitable solvent for 24-56 hours and then rinsed and washed with DI water.

EXAMPLE 9

The monolith of Example 7 was packed into a column following the column packing process in Example 5 and then agglomerated with latex as described in Example 6. This column is now suitable for anion analysis with basic eluents.

EXAMPLE 10

Sulfonated latex was prepared following Example 9 of U.S. Pat. No. 5,532,279. A solution of 350 grams water and 0.1 grams calcium chloride dihydrate was placed in a bottle and deairated for five minutes with nitrogen. A mixture of 21.66 grams of styrene, 1.42 grams commercial 80.5% divinylbenzene (containing 80.5% divinylbenzene), 0.14 grams of Vazo 33 (2,2-azobis (2,4-dimethyl-1-4-methoxy-valeronitrile), 3.66 grams of Atlox 3403 F (blend of anionic and nonionic surfactants) and 1.09 grams Atlox 3404 F was added to the deairated solution. The bottle was capped and tumbled at 32. degree. C. for 17 hours. Then 22 grams of Igepal DM880 (ethoxylated dialkylphenol) was added to the whole mixture in the bottle and the bottle capped and tumbled for 24 hours at 32. degree. C. The contents of the bottle were then filtered using Whatman's GF/A, GF/D and GF/F filters to remove any coagulum from the latex.

The latex was sulfonated by adding 92.4 grams of concentrated sulfuric acid to 20 grams of the filtered latex using an addition funnel. Then 137 grams of chlorosulfonic acid was added to the latex-sulfuric acid mixture using the addition funnel. The entire mixture of latex, sulfuric acid and chlorosulfonic acid was heated at 110. degree. C. for 2 hours. The mixture was cooled to 60. degree. C. and, using an addition funnel, was added to 1800 ml. of 3.22M sodium hydroxide to quench the sulfonation of the latex. The quenched latex was filtered using a Whatman's 541 filter to remove coagulum.

EXAMPLE 11

The monolith of Example 8 was packed into a column following the column packing process in Example 5. The column was then agglomerated with the latex from Example 10 as follows. Prepare a 1% latex solution in 400 mM sodium hydroxide. Pump the latex into the aminated monolithic column at a flow rate of 0.2 ml/min. Pump until the latex appears out of the column. Flush with DI water followed by the eluent. The latex agglomerated column is now suitable for cation analysis with acidic eluents.

What is claimed is:

1. A chromatography separation column having disposed therein flow-through ion exchange medium that allows control of column capacity and selectivity comprising a monolithic stationary phase having interconnecting pores defined by pore walls, and colloidal fine ion exchange polymeric layering particles irreversibly bound directly or indirectly to the pore walls in a layer.

2. The chromatography separation column of claim 1 in which the layering particles are covalently bound to said pore walls.

3. The chromatography separation column of claim 1 in which the layering particles are bound by adsorption.

4. The chromatography separation column of claim 1 in which said layering particles are bound to said pore walls through a dispersant.

5. The chromatography separation column of claim 1 in which said layering particles are bound to said pore walls by electrostatic attachment.

6. The chromatography separation column of claim 1 in which the stationary phase has pore sizes greater than 200 nm.

7. The chromatography separation column of claim 1 in which said layering particles have a median diameter ranging from about 0.002 to 0.2 microns.

* * * * *